United States Patent
Takemoto

(10) Patent No.: US 9,196,068 B2
(45) Date of Patent: Nov. 24, 2015

(54) PROJECTOR SYSTEM, AND METHOD FOR DRAWINGS

(71) Applicant: Ryo Takemoto, Kanagawa (JP)

(72) Inventor: Ryo Takemoto, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 232 days.

(21) Appl. No.: 13/917,133

(22) Filed: Jun. 13, 2013

(65) Prior Publication Data

US 2014/0015861 A1    Jan. 16, 2014

(30) Foreign Application Priority Data

Jul. 12, 2012  (JP) ................................. 2012-156932

(51) Int. Cl.
*G06T 11/60* (2006.01)

(52) U.S. Cl.
CPC ...................................... *G06T 11/60* (2013.01)

(58) Field of Classification Search
None
See application file for complete search history.

(56) References Cited

U.S. PATENT DOCUMENTS

| | | | |
|---|---|---|---|
| 5,544,260 A * | 8/1996 | Chefalas et al. | 382/187 |
| 5,926,566 A * | 7/1999 | Wang et al. | 382/185 |
| 6,005,200 A * | 12/1999 | Stanchak et al. | 178/19.01 |
| 6,421,042 B1 * | 7/2002 | Omura et al. | 345/157 |
| 6,429,856 B1 * | 8/2002 | Omura et al. | 345/175 |
| 6,437,314 B1 * | 8/2002 | Usuda et al. | 250/221 |
| 6,700,129 B1 * | 3/2004 | Usuda et al. | 250/559.29 |
| 7,218,782 B1 * | 5/2007 | Reihani | 382/186 |
| 8,116,570 B2 * | 2/2012 | Vukosavljevic et al. | 382/187 |
| 2001/0019325 A1 * | 9/2001 | Takekawa | 345/157 |
| 2001/0030668 A1 * | 10/2001 | Erten et al. | 345/863 |
| 2004/0085522 A1 * | 5/2004 | Honig et al. | 353/121 |
| 2004/0135776 A1 * | 7/2004 | Brouhon | 345/179 |
| 2005/0266386 A1 * | 12/2005 | Marggraff et al. | 434/317 |
| 2008/0044065 A1 * | 2/2008 | Crockett et al. | 382/119 |
| 2009/0063573 A1 | 3/2009 | Takemoto | |
| 2009/0115744 A1 * | 5/2009 | Zhang et al. | 345/179 |
| 2009/0237692 A1 | 9/2009 | Endoh et al. | |
| 2010/0021022 A1 * | 1/2010 | Pittel et al. | 382/123 |
| 2010/0309115 A1 * | 12/2010 | Sabanai et al. | 345/156 |
| 2011/0199297 A1 * | 8/2011 | Antonyuk et al. | 345/157 |
| 2011/0310409 A1 | 12/2011 | Yukumoto et al. | |
| 2012/0133970 A1 | 5/2012 | Yukumoto et al. | |
| 2012/0215828 A1 | 8/2012 | Torii et al. | |
| 2013/0125068 A1 * | 5/2013 | Harris et al. | 715/863 |

FOREIGN PATENT DOCUMENTS

| | | |
|---|---|---|
| JP | 2005-122534 | 5/2005 |
| JP | 2007-048135 | 2/2007 |
| JP | 2008-033049 | 2/2008 |

* cited by examiner

*Primary Examiner* — Stephen R Koziol
*Assistant Examiner* — Jason Pringle-Parker
(74) *Attorney, Agent, or Firm* — Oblon, McClelland, Maier & Neustadt, L.L.P.

(57) ABSTRACT

When a user or the like blocks a portion of a projected image, acquisition of position information about a drawing-designated position, which is designated using a pointing device, is inhibited, and a missing drawn portion is produced. However, a projection apparatus generates image data that is interpolated using a pattern image, thereby making it possible to draw a graphic object as drawn.

23 Claims, 14 Drawing Sheets

| TIME INFORMATION | POSITION INFORMATION | DRAWING REQUEST FLAG |
|---|---|---|
| 9:14:12:01 | 100, 100 | FLASE |
| 9:14:12:03 | 100, 102 | FLASE |
| 9:14:12:05 | 100, 103 | TRUE |
| 9:14:12:07 | 100, 105 | TRUE |
| 9:14:12:09 | ... | TRUE |
| 9:14:12:11 | ... | TRUE |
| 9:14:12:13 | 100, 110 | TRUE |
| ... | ... | ... |

FIG.5

| NO. | PATTERN IMAGE |
|---|---|
| 1 | ▭ |
| 2 | ▱ |
| 3 | ◇ |
| 4 | ⬭ |
| 5 | ⌂ |
| ... | ... |

| STRAIGHT LINE | ——————— |
| (UPPER) PORTION OF CIRCLE | ⌒ |
| (LOWER) PORTION OF CIRCLE | ⌣ |
| WAVY LINE 1 | ∿ |
| WAVY LINE 2 | ∿∿ |
| WAVY LINE 3 | ... |

| NO. | PATTERN IMAGE | PRIORITY |
|---|---|---|
| 1 |  | 1 |
| 2 |  | 5 |
| 3 |  | 2 |
| 4 |  | 4 |
| 5 |  | 3 |
| ... | ... | ... |

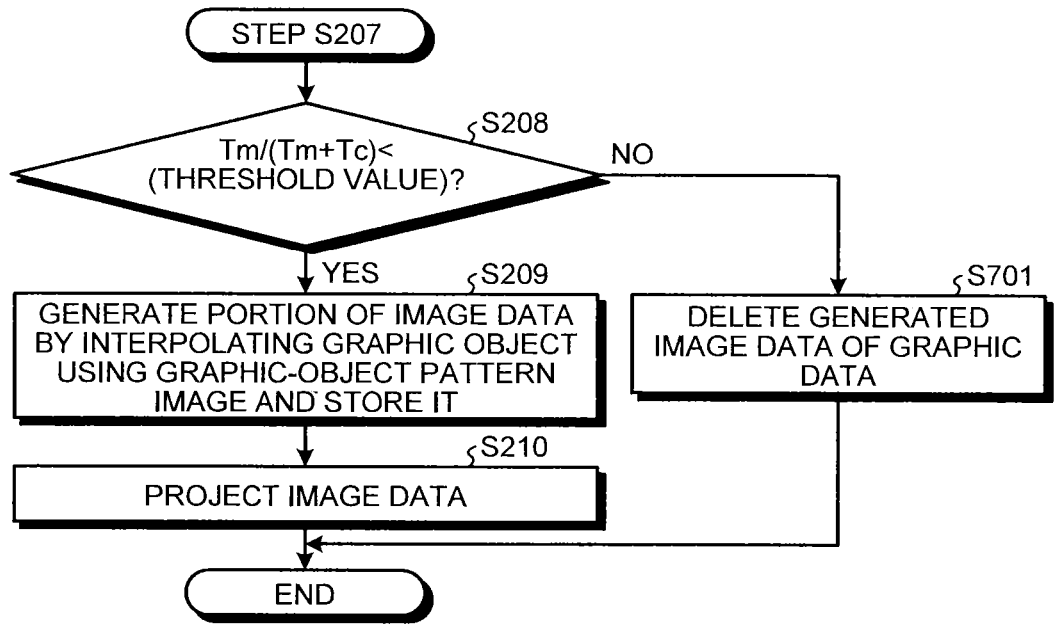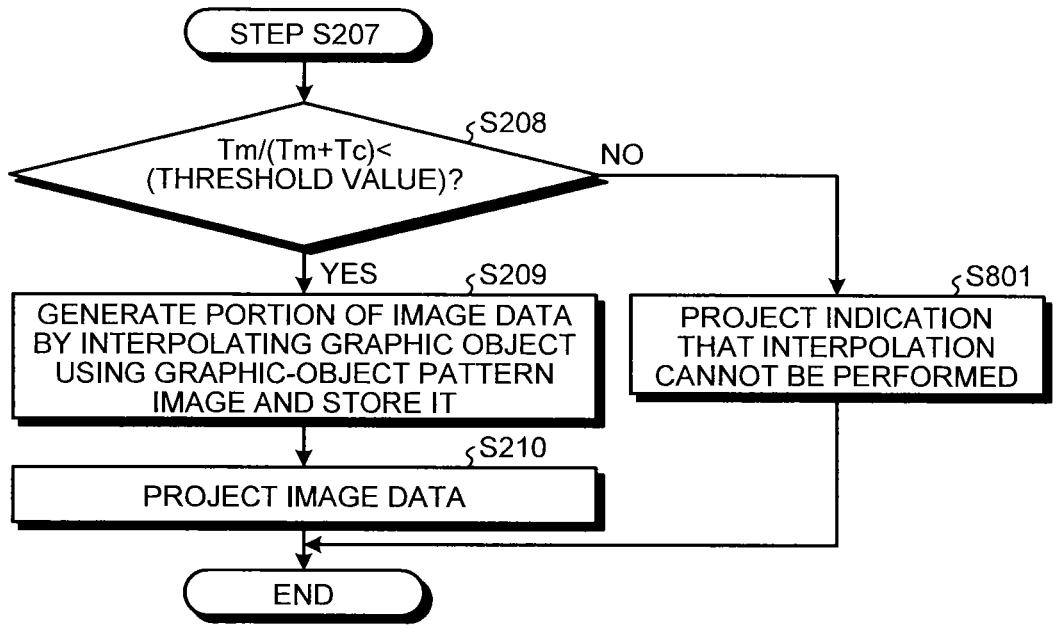

PROJECTOR SYSTEM, AND METHOD FOR DRAWINGS

CROSS-REFERENCE TO RELATED APPLICATIONS

The present application claims priority to and incorporates by reference the entire contents of Japanese Patent Application No. 2012-156932 filed in Japan on Jul. 12, 2012.

BACKGROUND OF THE INVENTION

1. Field of the Invention

The present invention relates generally to projection apparatuses, projection systems, and projection method.

2. Description of the Related Art

There are known techniques for pointing a surface, onto which an image is projected by a projector, with a pointing device and feeding back a text character, a line, a graphic object, or the like drawn with the pointing device onto the projection surface. For example, a technique disclosed in Japanese Patent Application Laid-open No. 2007-48135 employs the following method. When a graphic object is drawn on a projection surface using a pointing device, position information about the graphic object is specified by acquiring brightness or the like of coordinates of each of one-by-one pixel areas, for example. Image data of the newly created drawing is generated and projected onto a region indicated by the position information. When, for instance, a line is written using a pointing device, position information about each of pixels constituting the line is acquired, and image data corresponding to each position is projected.

In the conventional technique, it is necessary that a pattern for position detection, other image, and/or the like is properly projected onto the projection surface to acquire position information about a drawing-designated portion. However, in a situation where, for instance, a plurality of users write to the projection surface, a user can produce a shadow where a projection pattern is not projected onto the projection surface properly. As a result, a problem is likely occur that position information for drawing cannot be acquired.

Therefore, it is desirable to provide a projection apparatus that allows drawing to be performed even in a situation where a shadow cast onto a projection surface creates a portion where appropriate position detection is inhibited.

SUMMARY OF THE INVENTION

It is an object of the present invention to at least partially solve the problems in the conventional technology.

According to an aspect of the present invention, there is provided a projection apparatus that performs projection onto a projection surface, the projection apparatus including: a receiving unit that receives drawing position information and drawing request information transmitted from a drawing device for projecting image data onto the projection surface, the drawing position information indicating a drawing designated position on the projection surface, the drawing request information requesting that drawing be performed; a first generating unit that generates the image data to be projected onto the projection surface using the drawing position information that is received in a receiving period, over which the drawing request information is being received; a judgement-value calculating unit that calculates a drawing failure period, over which the drawing position information is not received in the receiving period; a pattern storage unit that stores multiple types of pattern images; a second generating unit that generates interpolation image data of a portion corresponding to the drawing failure period using one pattern image of the pattern images, the one pattern image being similar to the image data generated by the first generating unit; and a projecting unit that projects the image data generated by the first generating unit interpolated with the interpolation image data generated by the second generating unit.

According to another aspect of the present invention, there is provided a projection system including a drawing device for projecting image data onto a projection surface and a projection apparatus that performs projection onto the projection surface, the projection system including: a receiving unit that receives drawing position information and drawing request information transmitted from the drawing device, the drawing position information indicating a drawing designated position on the projection surface, the drawing request information requesting that drawing be performed; a first generating unit that generates the image data to be projected onto the projection surface using the drawing position information that is received in a receiving period, over which the drawing request information is being received; a judgement-value calculating unit that calculates a drawing failure period, over which the drawing position information is not received in the receiving period; a pattern storage unit that stores multiple types of pattern images; a second generating unit that generates interpolation image data of a portion corresponding to the drawing failure period using one pattern image of the pattern images, the one pattern image being similar to the image data generated by the first generating unit; and a projecting unit that projects the image data generated by the first generating unit interpolated with the interpolation image data generated by the second generating unit.

According to still another aspect of the present invention, there is provided a projection method that performs projection onto a projection surface, the projection method including: receiving, by a receiving unit, drawing position information and drawing request information transmitted from a drawing device for projecting image data onto the projection surface, the drawing position information indicating a drawing designated position on the projection surface, the drawing request information requesting that drawing be performed; generating, by a first generating unit, the image data to be projected onto the projection surface using the drawing position information that is received in a receiving period, over which the drawing request information is being received; calculating, by a judgement-value calculating unit, a drawing failure period, over which the drawing position information is not received in the receiving period; storing, by a pattern storage unit, multiple types of pattern images; generating, by a second generating unit, interpolation image data of a portion corresponding to the drawing failure period using one pattern image of the pattern images, the one pattern image being similar to the image data generated by the first generating unit; and projecting, by a projecting unit, the image data generated by the first generating unit interpolated with the interpolation image data generated by the second generating unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of a set of graphic-object pattern images for use in image data interpolation by the projection apparatus according to the first embodiment;

FIG. 17 is a flow diagram of a procedure to be performed by a projection apparatus according to a seventh embodiment for generating image data of a missing drawn portion by interpolation; and FIG. 18 is a flow diagram of a procedure to be performed by a projection apparatus according to an eighth embodiment for generating image data of a missing drawn portion by interpolation.

DETAILED DESCRIPTION OF THE PREFERRED EMBODIMENTS

Exemplary embodiments of the present invention are described in detail below with reference to the accompanying drawings.

First Embodiment

Figure 1:
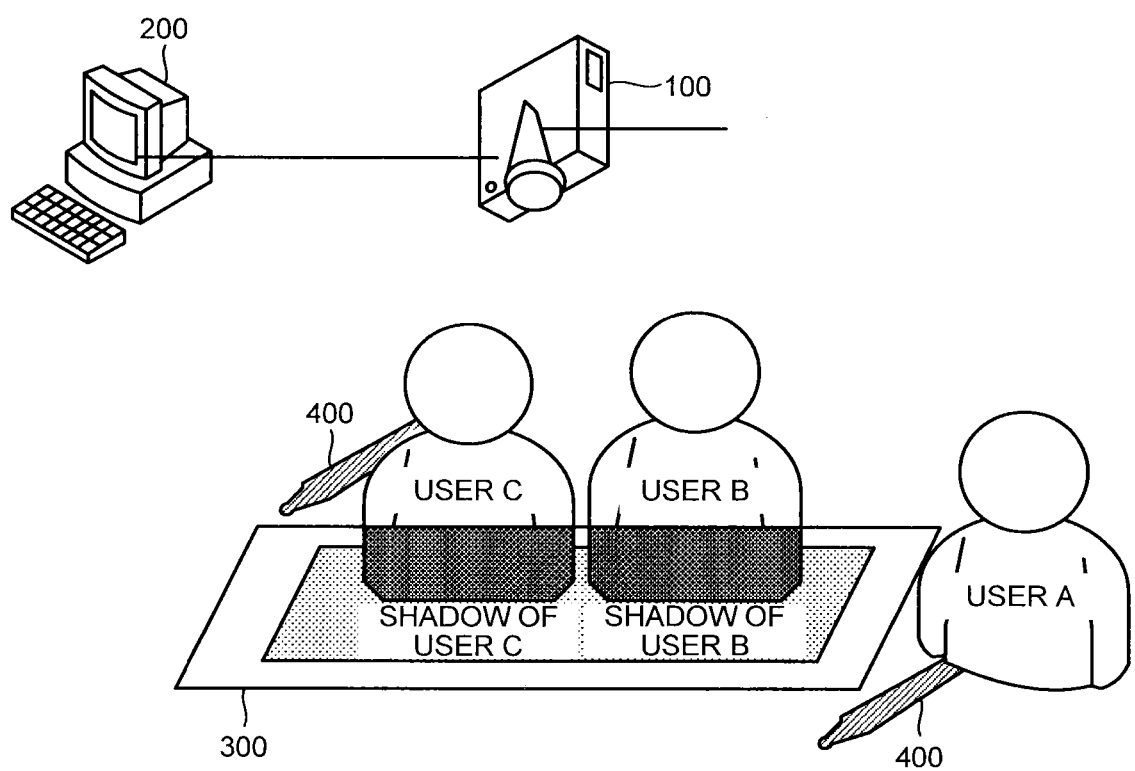
FIG. 1 is a diagram illustrating a situation where a projection apparatus according to a first embodiment is used.

FIG. 1 is a diagram illustrating a situation where a projector 100 included in a projection apparatus according to a first embodiment is used. In this example implementation, the projection apparatus includes an information processing apparatus 200, which performs various control operations on the projector 100, connected to the projector 100. Meanwhile, the various control operations to be performed by the information processing apparatus 200 can be implemented in the projector 100 as a one-piece-type configuration.

As illustrated in FIG. 1, each of three users, or, more specifically, users A, B, and C, writes a text character, a graphic object, and/or the like using a pointing device 400, which is a drawing device, to a projection surface 300, onto which image data is projected by the projector 100 placed above the projection surface 300. Referring to FIG. 1, the user B and the user C are at positions where they block the image data projected onto the projection surface 300 by the projector 100. Accordingly, shadows are created at blocked portions of the image data on the projection surface 300. Meanwhile, the drawing device is not limited to a pointing device and can be, for example, an electronic pen for direct drawing onto the projection surface.

Figure 2:
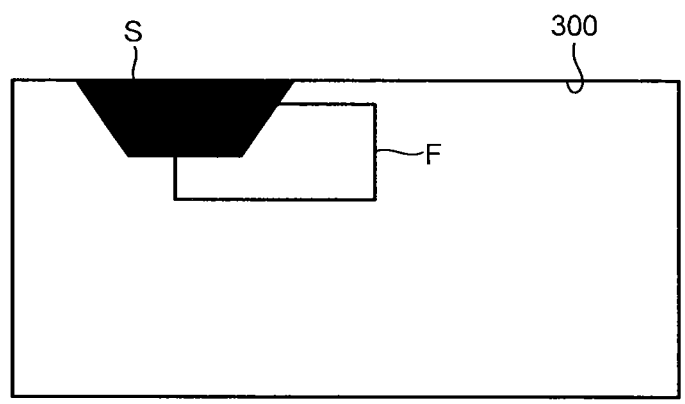
FIG. 2 is a diagram illustrating a situation where a projection apparatus according to the first embodiment is used.

FIG. 2 is a diagram illustrating a situation where the projection surface 300 is used. As illustrated in FIG. 2, a shadow S created by a user is cast onto the projection surface 300. When an attempt of drawing a graphic object F at a position overlapping the shadow S is made by a user, position information about a portion where the graphic object F overlaps the shadow S cannot be acquired. As a result, drawing at this portion is not created. However, the first embodiment includes a configuration for interpolating this missing drawn portion. The configuration will be described later.

Figures 3, 4:
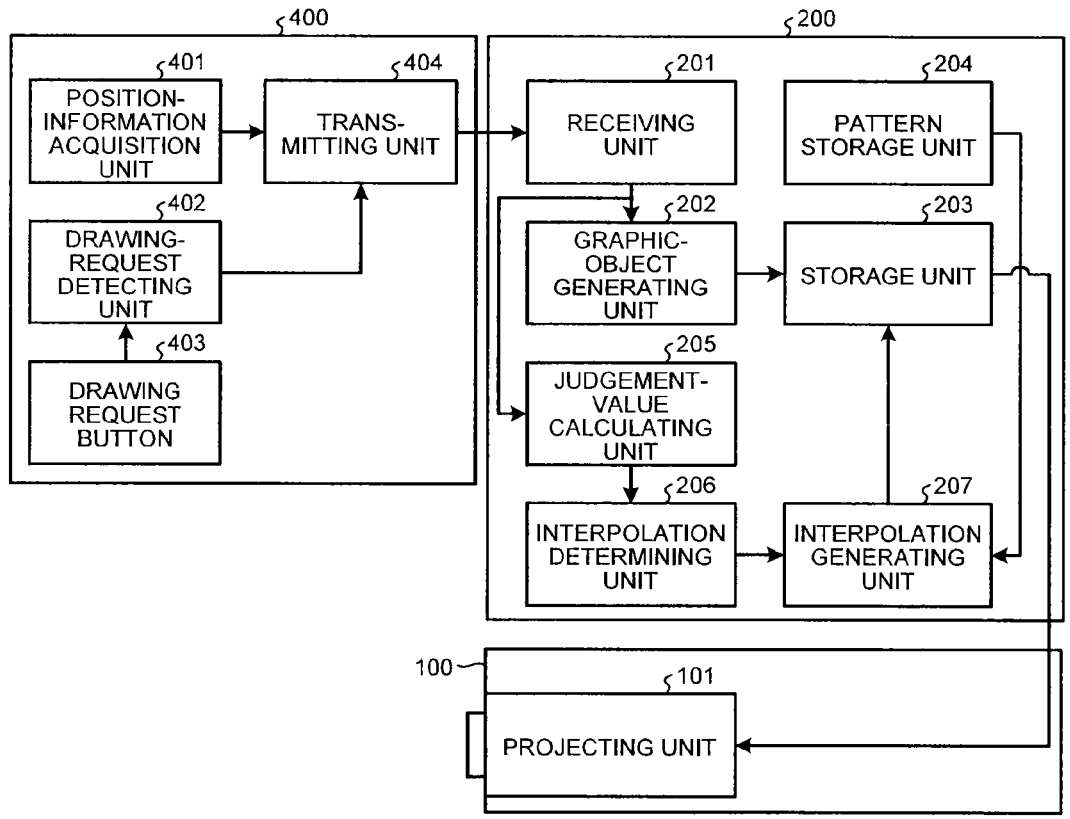
FIG. 3 is a block diagram illustrating a functional configuration of the projection apparatus according to the first embodiment.
FIG. 4 is a diagram illustrating an example of position information of drawing acquired by the projection apparatus according to the first embodiment.

FIG. 3 is a block diagram illustrating a functional configuration of the information processing apparatus 200, the projector 100, and the pointing device 400. As illustrated in FIG. 3, the pointing device 400 includes a position-information acquisition unit 401, a drawing-request detecting unit 402, a drawing request button 403, and a transmitting unit 404. The position-information acquisition unit 401 acquires position information about a position pointed by the pointing device 400 on the projection surface 300. The position information is coordinates assigned to each one-by-one pixel with reference to (0,0), which are coordinates of a top left corner on the projection surface, for example. The position-information acquisition unit 401 is not necessarily arranged in the pointing device 400. Alternatively, there may be employed a configuration, in which video data of a position pointed by the pointing device 400 is acquired using a camera provided in the information processing apparatus 200 or the projector 100, and position information is acquired by calculation by the information processing apparatus 200 or the projector 100. The position-information acquisition unit 401 also acquires time information that indicates time when the position information is acquired. The position information acquisition unit 401 acquires the position information and the time information 30 times per second, for example. Meanwhile, any one of various methods including that described above related to the conventional technique can be employed as a method for acquiring the position information, and repeated description is omitted.

The drawing-request detecting unit 402 detects a drawing request signal that is transmitted when the drawing request button 403 arranged on the pointing device 400 is pressed. The drawing request signal is used as follows: when a pointer from the pointing device 400 impinges on the projection surface 300 while the drawing request signal is detected, a path of the pointer is drawn on the projection surface 300. The drawing request signal is not necessarily configured to be output when the drawing request button 403 is pressed. For instance, there may be employed a configuration, in which when an operating pattern pointing specific drawing is performed on the pointing device 400, operations performed within a preset period of time after detection of the operating pattern are assumed as drawing instruction inputs.

The transmitting unit 404 transmits the acquired position information, the drawing request signal, and the time information to the information processing apparatus 200.

The information processing apparatus 200 includes a receiving unit 201, a graphic-object generating unit 202, a storage unit 203, a pattern storage unit 204, a judgement-value calculating unit 205, an interpolation determining unit 206, and an interpolation generating unit 207. The receiving unit 201 receives the position information, the drawing request signal, the time information, and the like transmitted from the pointing device 400. The graphic-object generating unit 202 generates, when the receiving unit 201 receives a drawing request signal, image data of a line, a graphic object, a text character, or the like produced by connecting pixels at positions on the projection surface 300 indicated by the position information received while the signal is being received. The storage unit 203 stores data generated by the information processing apparatus 200, data received from the pointing device 400, and the like.

FIG. 4 is a diagram illustrating an example of data received from the pointing device 400 and stored in the storage unit 203. As illustrated in FIG. 4, data is stored in the storage unit 203 each time the data is received at a predetermined frequency, which is 30 times per second in the first embodiment. The data is made up of the acquired time information, the position information, and a drawing request flag indicating whether or not the drawing request signal is received. The position information is in a form of coordinates on the projection surface 300 with reference to the origin, which is the top left corner. There are two types of the drawing request flag, which are true and false. When the received data contains the drawing request flag that is true and acquired position information, the graphic-object generating unit 202 creates image data to be drawn from the data. On the other hand, when the received data does not contain acquired position information even though the drawing request flag of the data is true, it is indicated that the position information about a drawing-designated position cannot be acquired for any reason.

Figure 5:
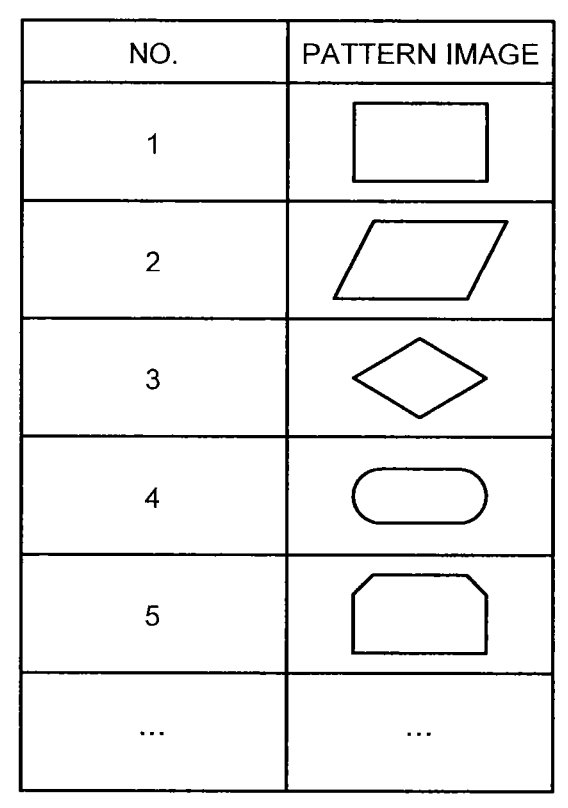

The pattern storage unit 204 stores multiple types of graphic-object pattern images for use in interpolating a portion where drawing using the pointing device 400 has failed, which will be described later. FIG. 5 illustrates an example of a set of pattern images stored in the pattern storage unit 204. Pattern images represent simplified shapes of graphic objects. The pattern images are classified in such a manner that allows differentiating between distinctive portions of the graphic objects using a known technique for determining similarity between graphic objects or the like.

The judgement-value calculating unit 205 calculates a drawing failure period when drawing using the pointing device 400 has failed. The drawing failure period is a judgement value for determining whether or not to execute processing for interpolating this missing drawn portion. The drawing failure period is a period, in the received time information, over which position information is not acquired even though the drawing request flag is true. In the example illustrated in FIG. 4, the drawing failure period is 0.6 second between "9:14:12:07" and "9:14:12:13". The interpolation determining unit 206 determines whether or not to interpolate data of a portion corresponding to the drawing failure period of the image data created by drawing. When it is determined that the data is to be interpolated, the interpolation generating unit 207 generates interpolation image data based on a pattern selected from the pattern storage unit 204 and stores the interpolation image data in the storage unit 203.

The projector 100 includes a projecting unit 101 that projects the image data generated by the information processing apparatus 200 and stored in the storage unit 203 onto the projection surface 300.

Figure 6:
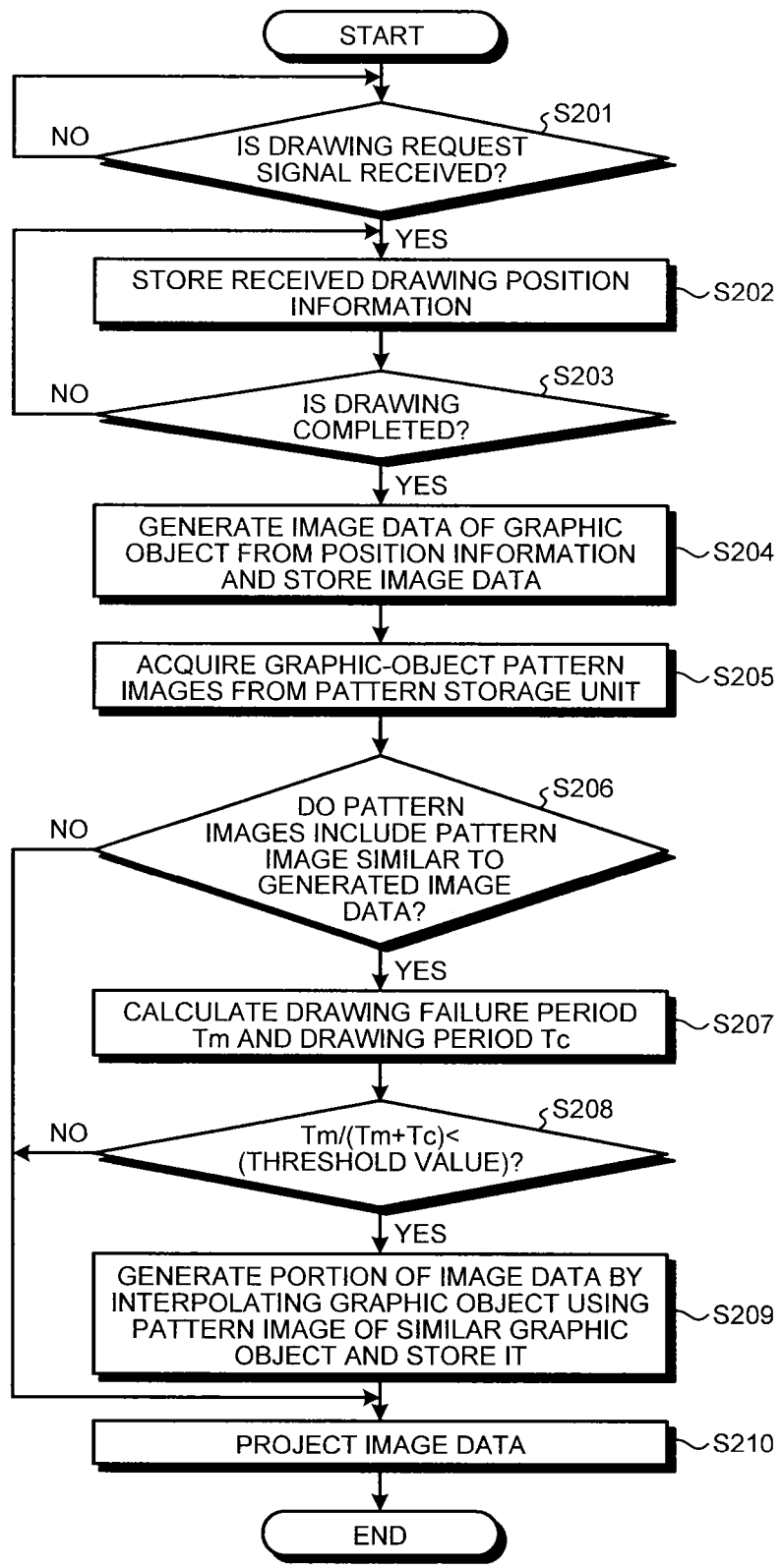
FIG. 6 is a flow diagram of a procedure to be performed by the projection apparatus according to the first embodiment for generating image data of a missing drawn portion by interpolation.

A procedure for generating image data by interpolating a missing drawn portion, position information about which cannot be acquired because of the shadow S of a user or the like as described above, according to the first embodiment is described below with reference to FIG. 6.

The receiving unit 201 determines whether or not a drawing request signal is received from the pointing device 400 (Step S201). When the receiving unit 201 determines that a drawing request signal is not received from the pointing device 400 (No in Step S201), the receiving unit 201 repeats this step until receiving a drawing request signal. When the receiving unit 201 determines that a drawing request signal is received from the pointing device 400 (Yes in Step S201), the receiving unit 201 stores position information about a drawing-designated position and time information in the storage unit 203 (Step S202).

Subsequently, the receiving unit 201 determines whether drawing using the pointing device 400 is completed or, more specifically, determines whether or not a drawing request flag based on a drawing request signal received from the pointing device 400 is changed from true to false (Step S203). When the receiving unit 201 determines that drawing using the pointing device 400 is not completed (No in Step S203), the receiving unit 201 continues storing acquired position information until drawing is completed. On the other hand, when it is determined that drawing using the pointing device 400 is completed (Yes in Step S203), the graphic-object generating unit 202 generates image data of a graphic object from the stored position information, and stores the image data in the storage unit 203 (Step S204). The interpolation generating unit 207 then acquires the graphic-object pattern images from the pattern storage unit 204 (Step S205).

Subsequently, the interpolation generating unit 207 determines whether or not the acquired pattern images include a pattern image similar to the image data of the graphic object generated by the graphic-object generating unit 202 (Step S206). When it is determined that the graphic-object pattern images do not include such a similar pattern image (No in Step S206), the projecting unit 101 projects only the image data generated by the graphic-object generating unit 202 (Step S210). On the other hand, when it is determined the graphic-object pattern images include such a similar pattern image (Yes in Step S206), the judgement-value calculating unit 205 calculates a drawing failure period Tm and a drawing period Tc (Step S207). The drawing period Tc is a period, during which the drawing request flag is true and position information is successfully received.

Subsequently, the interpolation determining unit 206 determines whether or not "Tm/(Tm+Tc)<(threshold value)" holds with the calculated values of the drawing failure period Tm and the drawing period Tc (Step S208). The reason why this determination is made is because when a proportion of a missing drawn portion in a drawn graphic object is equal to or greater than the threshold value, it is difficult to guess a shape of an interpolation graphic object or the like based on a successfully drawn portion. In the first embodiment, the determination is made using the proportion of the drawing failure period Tm. Alternatively, there can be employed a configuration, in which interpolation of a graphic object is not performed when the drawing failure period is longer than a preset period or when a distance between positions indicated by position information of the drawing failure period is long.

When it is determined that "Tm/(Tm+Tc)<(threshold value)" holds (Yes in Step S208), the interpolation generating unit 207 generates a portion of image data by interpolating the graphic object of a drawing-failed portion using one of the pattern images that is most similar to the successfully-drawn graphic object, and stores the portion of the image data in the storage unit 203 (Step S209). The projecting unit 101 projects both the image data generated by the graphic-object generating unit 202 and stored in the storage unit 203 and the image data generated by the interpolation generating unit 207 and stored in the storage unit 203 (Step S210). On the other hand, when it is determined that Tm/(Tm+Tc) is greater than the threshold value (No in Step S208), the projecting unit 101 projects only the image data generated by the graphic-object generating unit 202 (Step S210).

The projection apparatus according to the first embodiment described above provides the following advantage. When a user or the like blocks a portion of a projected image, acquisition of position information about a drawing-designated position, which is designated using the pointing device 400, is inhibited, and a missing drawn portion is produced. However, the projection apparatus generates image data that is interpolated using a pattern image, thereby making it possible to draw a graphic object as drawn.

Furthermore, the projection apparatus is configured to determine whether or not interpolating a missing drawn portion is practicable based on a size of a drawing-failed portion or a length of time taken to draw the drawing-failed portion, and performs image data interpolation only when it is determined that interpolation is practicable. Accordingly, possibility that interpolation is improperly performed in a situation where information necessary for interpolating the missing drawn portion is insufficient can be reduced.

Second Embodiment

A projection apparatus according to a second embodiment of the present invention is described below. In the second embodiment, image data interpolation is performed using line pattern images rather than using graphic-object pattern images.

Figures 7, 8:
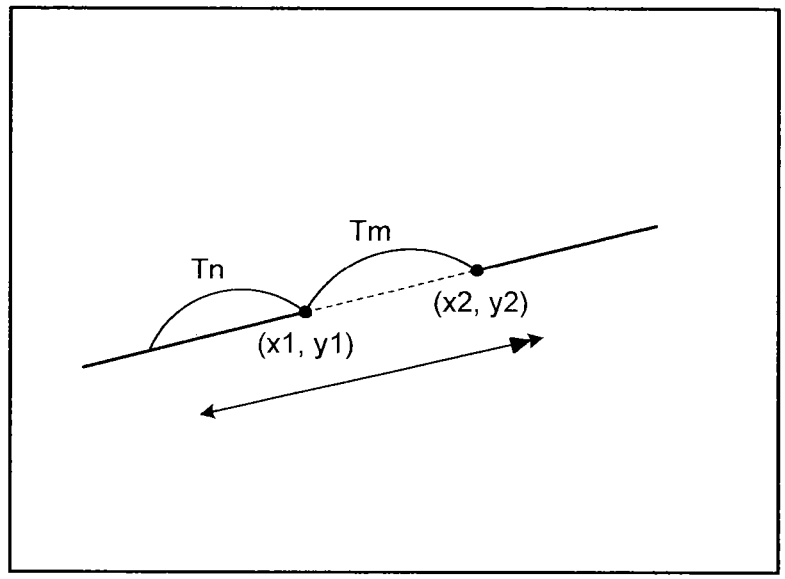
FIG. 7 is a diagram illustrating a missing drawn line portion in a projection apparatus according to a second embodiment.
FIG. 8 is a diagram illustrating an example of a set of line pattern images for use in image data interpolation by the projection apparatus according to the second embodiment.

Referring to FIG. 7, a portion between two points (x1,y1) and (x2,y2) is a missing drawn portion that corresponds to the drawing failure period Tm. In the second embodiment, the missing drawn portion is interpolated using a pattern image similar to a line drawn in a period Tn immediately before the drawing failure period Tm.

FIG. 8 is a diagram illustrating an example of a set of multiple types of line pattern images. The interpolation generating unit 207 generates image data using one of the line pattern images that is similar in shape to the line drawn in the period Tn.

Figure 9:
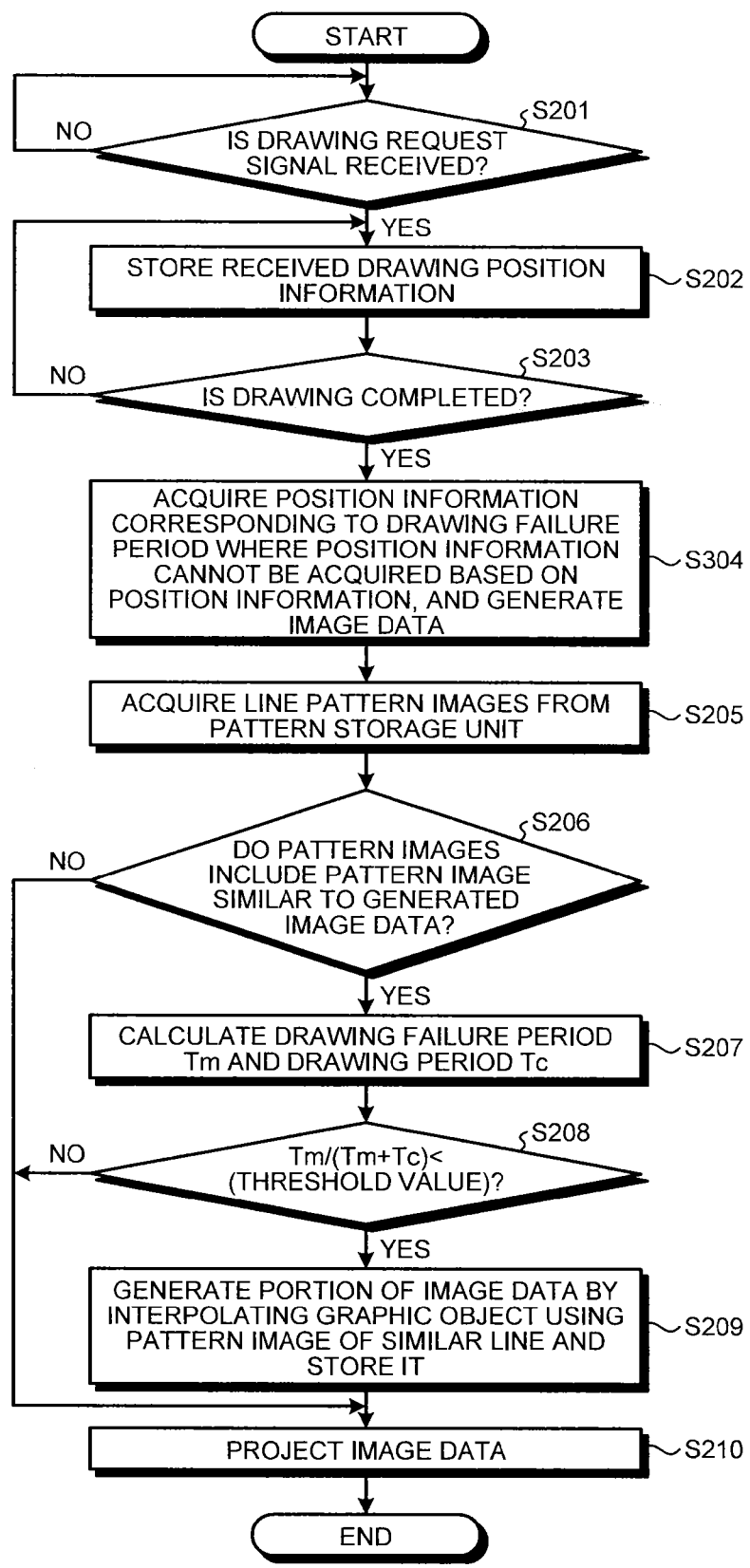
FIG. 9 is a flow diagram of a procedure to be performed by the projection apparatus according to the second embodiment for generating image data of a missing drawn portion by interpolation.

FIG. 9 is a flow diagram of a procedure according to the second embodiment for generating a missing drawn portion by interpolation. Each step identical to that of FIG. 6 is denoted by a like step number. Only portions of the procedure that differ from the procedure illustrated in FIG. 6 are described below.

The graphic-object generating unit 202 acquires position information of the period Tn immediately before the drawing failure period Tm, in which position information about cannot be acquired, using position information, and generates image data corresponding to the period Tn (Step S304). The interpolation generating unit 207 compares acquired line pattern images against this generated line image data, and generates image data using one of the pattern images similar to the generated line image data.

Line interpolation is not necessarily performed using the pattern images. Alternatively, interpolation may be performed in a manner to repeat a shape of a line corresponding to a period immediately before the drawing failure period Tm. Note that the pattern images are not limited to graphic-object or line pattern images. For instance, there can be employed a configuration, in which text-character pattern images are stored in advance so that text-character interpolation is performed when a text-character is drawn.

Third Embodiment

A third embodiment of the present invention is described below. In the third embodiment, the projection apparatus is configured so as to allow a user to select a pattern image to be used when the pattern images include multiple pattern images similar to a drawn graphic object or the like. This is achieved by causing the projecting unit 101 to temporarily project the pattern images.

Figure 10:
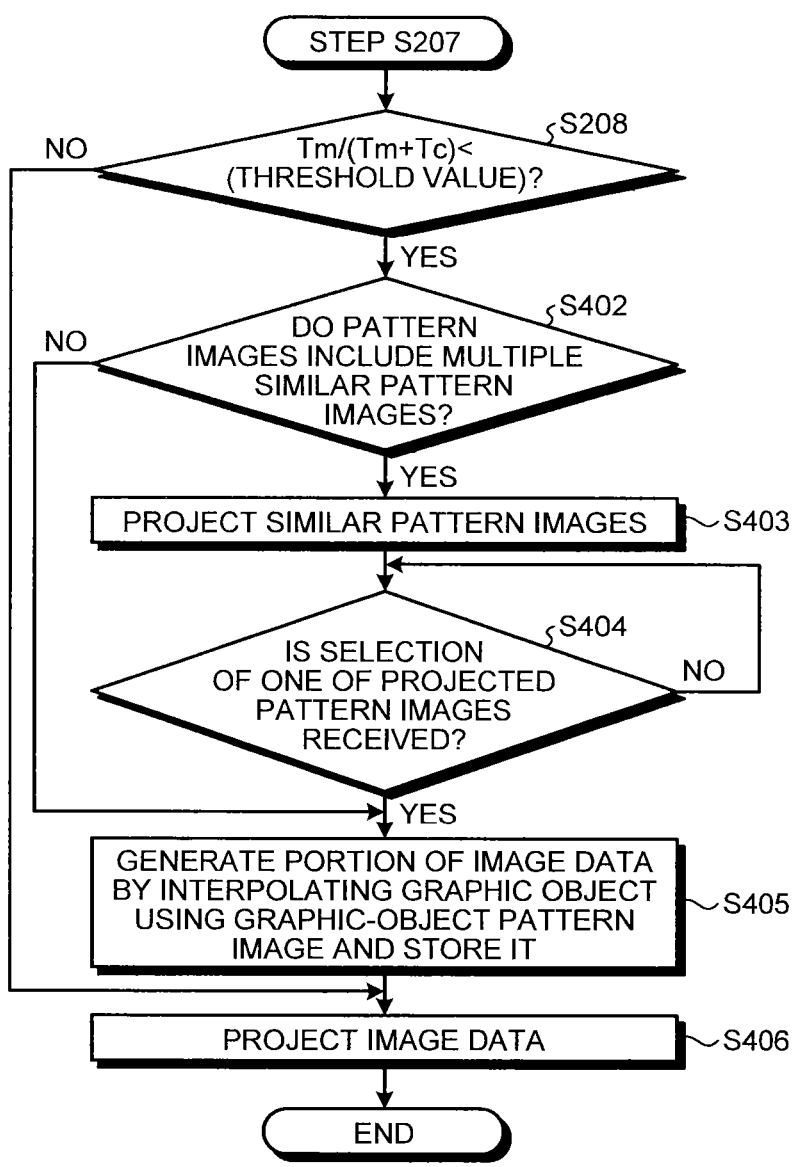
FIG. 10 is a flow diagram of a procedure to be performed by a projection apparatus according to a third embodiment for generating image data of a missing drawn portion by interpolation.

FIG. 10 is a flow diagram of a procedure according to the third embodiment for generating a missing drawn portion by interpolation. Illustrated in FIG. 10 are steps continued from "Yes" option in Step S208. When it is determined that "Tm/(Tm+Tc)<(threshold value)" holds (Yes in Step S208), whether or not the pattern images include multiple pattern images similar to the image data of the drawn graphic object or the like is determined (Step S402). Meanwhile, a pattern image is determined as being a similar pattern image when a judgement value, which indicates a degree of similarity and is calculated from a feature point contained in each image data set, is equal to or greater than a predetermined value. The judgement value can be calculated using a known method.

When the pattern images do not include multiple pattern images similar to the image data of the drawn graphic object or the like or, in other words, the pattern images include a single similar pattern image (No in Step S402), the interpolation generating unit 207 generates image data by interpolating the missing drawn portion using the similar pattern image as in the first embodiment, and stores the image data in the storage unit 203 (Step S405). On the other hand, when the pattern images include multiple pattern images similar to the image data of the drawn graphic object or the like (Yes in Step S402), the projecting unit 101 projects each of the similar pattern images (Step S403). Alternatively, all the pattern images, rather than only the similar pattern images, may be projected. The projection apparatus is placed on standby until selection of one of the projected pattern images is received (No in Step S404). To receive this selection, there can be employed a configuration, in which selection is made by, for instance, pressing the drawing request button 403 in a state where a pointer from the pointing device 400 is superimposed on one of the pattern image.

When one of the pattern images is selected (Yes in Step S404), the interpolation generating unit 207 generates image data by interpolating the missing drawn portion using the selected pattern image, and stores the image data in the storage unit 203 (Step S405). The projecting unit 101 projects the interpolated image data, too (Step S406).

The projection apparatus according to the third embodiment allows a user to select one of the pattern images. Accordingly, the user can select a pattern image of a same graphic object or the like as that the user intended to draw. As a result, possibility that a missing drawn portion is undesirably interpolated to create drawing different from what the user intended to draw can be reduced.

Fourth Embodiment

A fourth embodiment of the present invention is described below. In the fourth embodiment, it is assumed that pattern images include multiple similar pattern images as in the third embodiment; however, the fourth embodiment differs from the third embodiment in using a pattern image of high priority. The fourth embodiment is described below with reference to FIGS. 11 and 12.

Figure 11:
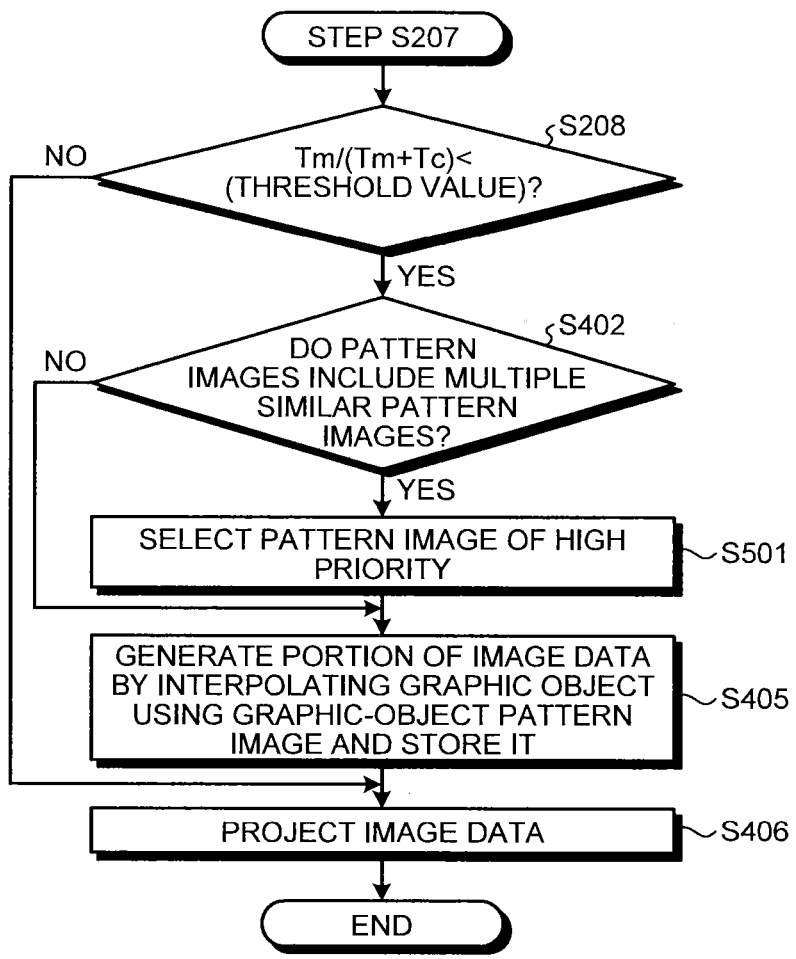
FIG. 11 is a flow diagram of a procedure to be performed by a projection apparatus according to a fourth embodiment for generating image data of a missing drawn portion by interpolation.
Figure 12:
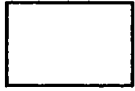
FIG. 12 is a diagram illustrating an example of a set of graphic-object pattern images for use in image data interpolation by the projection apparatus according to the fourth embodiment.
Figure 12:
Figure 12:
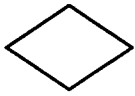
Figure 12:
Figure 12:

As illustrated in FIG. 11, when the pattern images include multiple similar pattern images (Yes in Step S402), a pattern image of high priority is selected (Step S501). As illustrated in FIG. 12, priority is assigned to each of the pattern images and stored as being associated therewith. In the fourth embodiment, the smaller the value of the priority, the higher the priority is. Therefore, a pattern image that is highest in priority among the similar pattern images can be selected. When one of the pattern images is selected, the interpolation generating unit 207 generates image data by interpolating the missing drawn portion using the selected pattern image, and stores the image data in the storage unit 203 (Step S405). The projecting unit 101 projects the interpolated image data, too (Step S406).

The projection apparatus according to the fourth embodiment described above provides the following advantage. When higher priorities are given to pattern images similar to frequently-drawn graphic objects in advance, a missing drawn portion of a graphic object or the like is automatically interpolated with an optimum pattern image, and the need for a user to select one of pattern images is eliminated.

Fifth Embodiment

Figure 13:
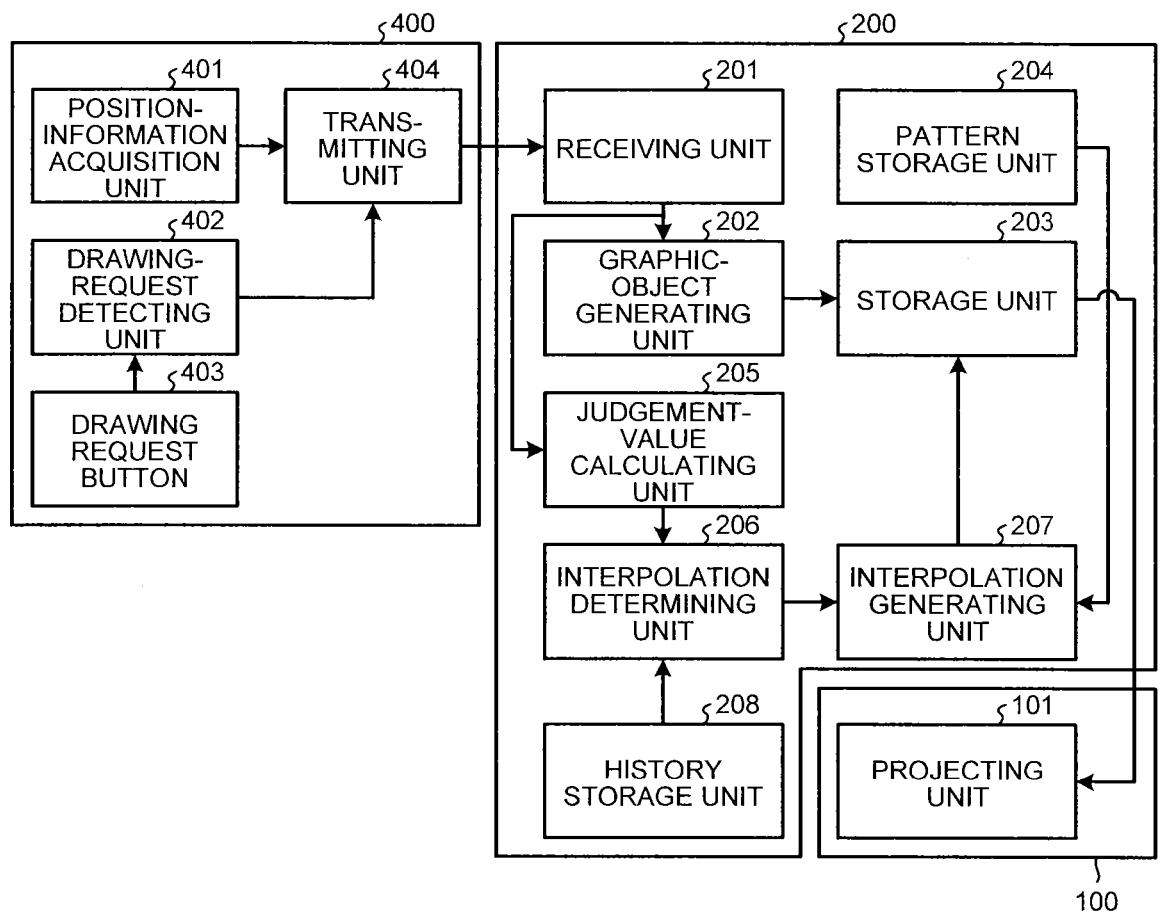
FIG. 13 is a block diagram illustrating a functional configuration of a projection apparatus according to a fifth embodiment.

A fifth embodiment is described below. A projection apparatus according to the fifth embodiment further includes a history storage unit 208 as illustrated in FIG. 13. The history storage unit 208 stores history of uses of each pattern image in interpolation of missing drawn portions. Specifically, each time one pattern image is used in interpolation, a history record of the use of the one pattern image is additionally stored in the history storage unit 208.

Figure 14:
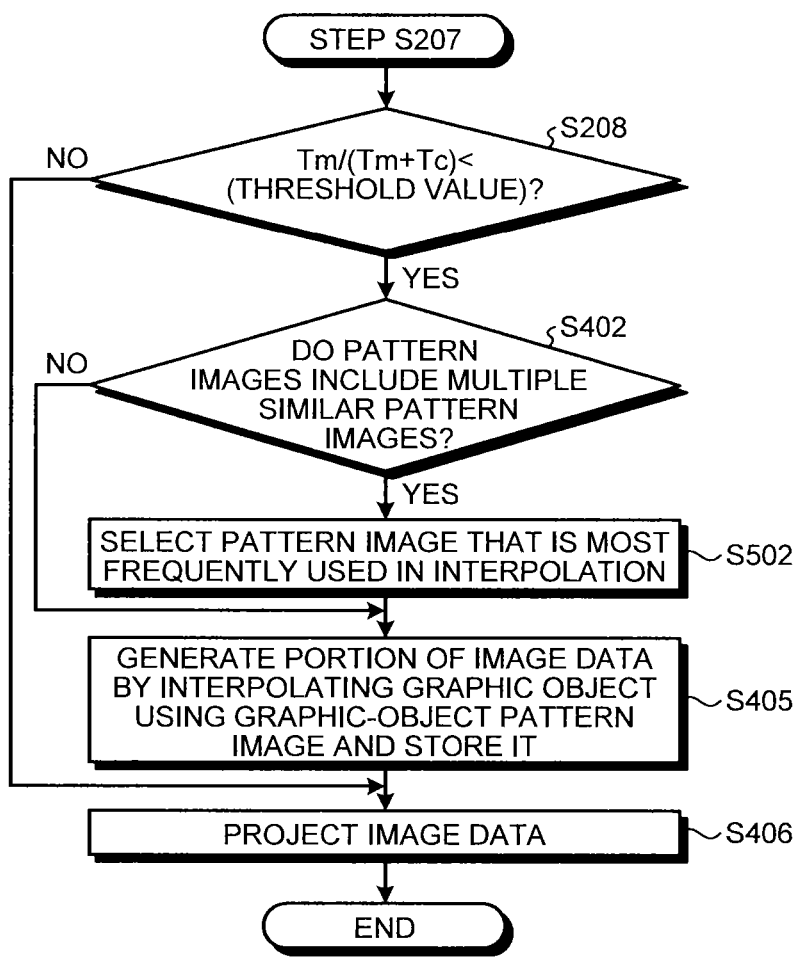
FIG. 14 is a flow diagram of a procedure to be performed by the projection apparatus according to the fifth embodiment for generating image data of a missing drawn portion by interpolation.

FIG. 14 illustrates a procedure according to the fifth embodiment for generating a missing drawn portion by interpolation. As illustrated in FIG. 14, when the pattern images include multiple similar pattern images (Yes in Step S402), a pattern image that is largest in the number of the history records is selected from the similar pattern images by consulting the pattern image history stored in the history storage unit 208 (Step S502). When one of the pattern images is selected, the interpolation generating unit 207 generates image data by interpolating the missing drawn portion using the selected pattern image, and stores the image data in the storage unit 203 (Step S405). The projecting unit 101 projects the interpolated image data, too (Step S406).

The projection apparatus according to the fifth embodiment increases a chance of selecting a pattern image similar to a graphic object, a text character, or the like that is frequently used by a user in presentation or the like by using a pattern image that is most frequently used in interpolation of drawing.

Sixth Embodiment

Figure 15:
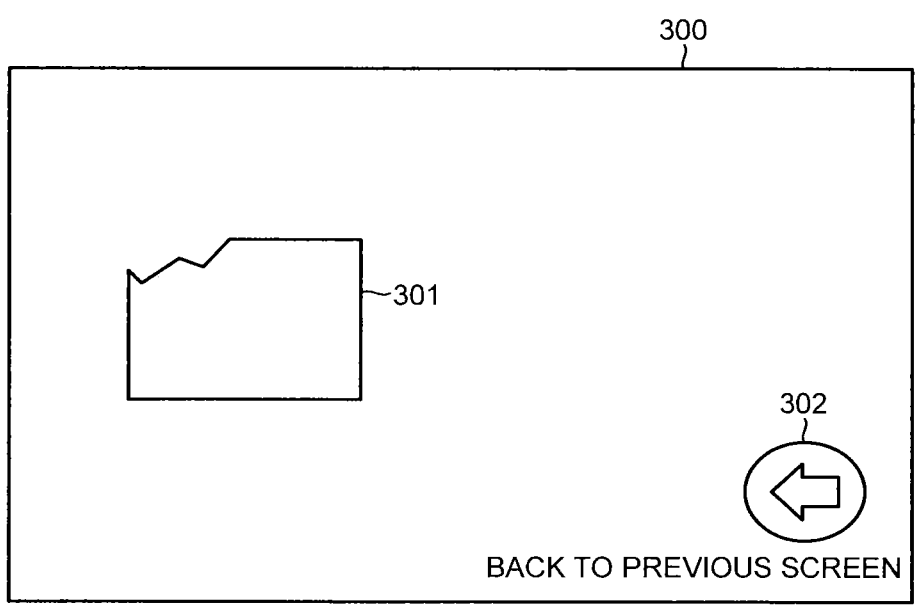
FIG. 15 is a diagram illustrating an example of a projection surface according to a sixth embodiment.

A projection apparatus according to a sixth embodiment is configured to delete interpolated image data when an interpolated and projected portion differs from what is intended by a user. FIG. 15 illustrates an example of image data projected onto the projection surface 300. Referring to FIG. 15, image data 301 is projected onto the projection surface 300. A portion of the image data 301 is image data generated by the interpolation generating unit 207. An image deletion button 302 is displayed on the projection surface 300. The image deletion button 302 is operated to delete the interpolated image data when the interpolated image data differs from what is intended by a user. When the image deletion button 302 is selected, the portion, which is the image data generated by the interpolation generating unit 207, is deleted from the projected image data.

Figure 16:
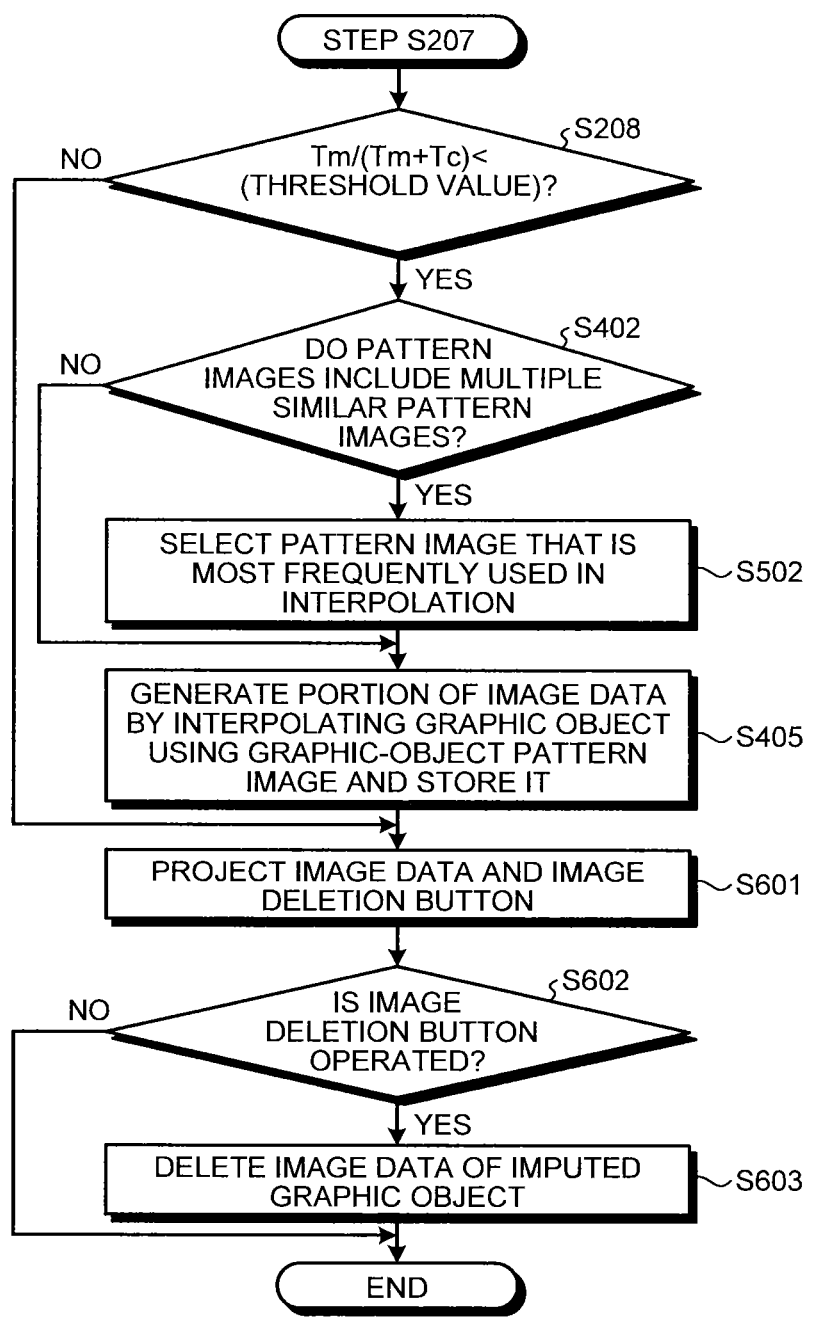
FIG. 16 is a flow diagram of a procedure to be performed by a projection apparatus according to the sixth embodiment for deleting image data of a missing drawn portion.

FIG. 16 is a flow diagram of a procedure for deleting image data. As illustrated in FIG. 16, the projecting unit 101 projects the image data generated by the interpolation generating unit 207, the image data generated by the graphic-object generating unit 202, and the image deletion button 302 (Step S601). Subsequently, whether or not the image deletion button 302 is operated is determined (Step S602). When it is determined that the image deletion button 302 is operated (Yes in Step S602), the portion of the image data corresponding to the interpolated graphic object or the like is deleted (Step S603; a deleting unit). On the other hand, when the image deletion button 302 is not operated (for example, when the image deletion button 302 is not operated before preset time elapses) (No in Step S602), the procedure ends.

The projection apparatus according to the sixth embodiment makes it possible to delete an interpolated portion of image data when the interpolated portion differs from what is intended by a user.

Seventh Embodiment

According to a seventh embodiment, as illustrated in FIG. 17, when it is determined that interpolation of the missing drawn portion is impracticable (No in Step S208), the image data of the graphic object or the like generated by the graphic-object generating unit 202 is deleted (Step S701; the deleting unit), and the procedure ends. According to this embodiment, an incomplete graphic object or the like resulting from failure of interpolation of the missing drawn portion can be automatically deleted.

Eighth Embodiment

According to an eighth embodiment, as illustrated in FIG. 18, when it is determined that interpolation of the missing drawn portion is impracticable (No in Step S208), the projecting unit projects an indication that interpolation cannot be performed (Step S801), and the procedure ends.

In each of the embodiments, the projection apparatus or the information processing apparatus has a hardware configuration implemented in a typical computer and includes a control device such as a central processing unit (CPU), a storage device such as a read only memory (ROM) and a random access memory, an external storage device such as a hard disk drive and/or a compact disc (CD) drive, a display device, and an input device such as a keyboard and/or a mouse.

In each of the embodiments, program instructions to be executed by the projection apparatus are provided as being recorded in a non-transitory tangible computer-readable storage medium as a file in an installable format or an executable format. The non-transitory tangible computer-readable storage medium can be a compact disk read only memory, a flexible disk, a compact disk recordable, a digital versatile disk, or the like.

In each of the embodiments, the program instructions to be executed by the projection apparatus may be configured to be stored in a computer connected to a network such as the Internet and provided by downloading over the network. In each of the embodiments, the program instructions to be executed by the projection apparatus may be configured to be provided or distributed over a network such as the Internet.

In each of the embodiments, the program instructions to be executed by the projection apparatus may be configured to be provided as being stored in a ROM or the like in advance.

In each of the embodiments, the program instructions to be executed by the projection apparatus have a module structure including the units described above. From the viewpoint of actual hardware, the CPU (processor) reads out the program instructions from the storage medium and executes the program instructions to load the units into a main memory device, thereby generating the units on the main memory device.

According to an aspect of one embodiment, it is possible perform drawing even in a situation where a shadow cast onto a projection surface creates a portion where appropriate position detection is inhibited.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection apparatus that performs projection onto a projection surface, the projection apparatus comprising:
    a receiving unit that receives drawing position information and drawing request information transmitted from a drawing device for projecting image data onto the projection surface, the drawing position information indicating a drawing designated position on the projection surface, the drawing request information requesting that drawing be performed;
    a first generating unit that generates the image data to be projected onto the projection surface using the drawing position information that is received in a receiving period, over which the drawing request information is being received;
    a judgement-value calculating unit that calculates a drawing failure period, over which the drawing position information is not received in the receiving period;
    a pattern storage unit that stores multiple types of pattern images;
    a second generating unit that generates interpolation image data of a portion corresponding to the drawing failure period using one pattern image of the pattern images, the one pattern image being similar to the image data generated by the first generating unit;
    a projecting unit that projects the image data generated by the first generating unit interpolated with the interpolation image data generated by the second generating unit; and
    an interpolation determining unit that determines whether or not to generate the interpolation image data by interpolating a missing drawn line portion corresponding to the drawing failure period, based on a value of the drawing failure period, wherein
    when the interpolation image data is determined to be generated by interpolating the portion, the second generating unit generates the interpolation image data of the portion using the one pattern image similar to the image data generated by the first generating unit.

2. The projection apparatus according to claim 1, wherein
    the pattern storage unit stores multiple types of graphic-object pattern images, and
    the second generating unit generates the interpolation image data of the portion of a graphic object corresponding to the drawing failure period using one pattern image of the pattern images, the one pattern image being similar to the image data of the graphic object generated by the first generating unit.

3. The projection apparatus according to claim 1, wherein
    the pattern storage unit stores multiple types of line pattern images, and
    the second generating unit generates the interpolation image data of the line corresponding to the drawing failure period using one pattern image of the pattern images, the one pattern image being similar in shape to the line drawn immediately before and after the drawing failure period.

4. The projection apparatus according to claim 1, further comprising
    a selection accepting unit, wherein
    the projecting unit projects the multiple types of pattern images stored in the pattern storage unit,
    the selection accepting unit accepts selection of a pattern image from among the projected multiple types of pattern images from the drawing device, and
    the second generating unit generates the interpolation image data corresponding to the drawing failure period using the selected pattern image.

5. The projection apparatus according to claim 1, wherein
    the pattern storage unit stores priorities of the pattern images on a pattern-image-by-pattern-image basis, and
    the second generating unit generates the interpolation image data corresponding to the drawing failure period using one pattern image of the pattern images, the one pattern image that is highest in priority.

6. The projection apparatus according to claim 1, further comprising
    a history storage unit that stores history records about past uses of the pattern images by the second generating unit in generating the interpolation image data, wherein
    the second generating unit generates the interpolation image data corresponding to the drawing failure period using one pattern image of the pattern images, the one pattern image being largest in number of the history records.

7. The projection apparatus according to claim 1, further comprising a deleting unit that, when instructed by the drawing device, deletes the interpolation image data projected by the projecting unit.

8. The projection apparatus according to claim 1, further comprising a deleting unit that deletes the image data generated by the first generating unit when the interpolation determining unit determines that generating the image data by interpolating the missing drawn portion corresponding to the drawing failure period is impracticable.

9. The projection apparatus according to claim 1, wherein the projecting unit projects an indication that interpolation is impracticable when the interpolation determining unit determines that generating the image data by interpolating the portion, which is a missing drawn portion, corresponding to the drawing failure period is impracticable.

10. A projection system including a drawing device for projecting image data onto a projection surface and a projection apparatus that performs projection onto the projection surface, the projection system comprising:

a receiving unit that receives drawing position information and drawing request information transmitted from the drawing device, the drawing position information indicating a drawing designated position on the projection surface, the drawing request information requesting that drawing be performed;

a first generating unit that generates the image data to be projected onto the projection surface using the drawing position information that is received in a receiving period, over which the drawing request information is being received;

a judgement-value calculating unit that calculates a drawing failure period, over which the drawing position information is not received in the receiving period;

a pattern storage unit that stores multiple types of pattern images;

a second generating unit that generates interpolation image data of a portion corresponding to the drawing failure period using one pattern image of the pattern images, the one pattern image being similar to the image data generated by the first generating unit;

a projecting unit that projects the image data generated by the first generating unit interpolated with the interpolation image data generated by the second generating unit; and an interpolation determining unit that determines whether or not to generate the interpolation image data by interpolating a missing drawn line portion corresponding to the drawing failure period, based on a value of the drawing failure period, wherein when the interpolation image data is determined to be generated by interpolating the portion, the second generating unit generates the interpolation image data of the portion using the one pattern image similar to the image data generated by the first generating unit.

11. The projection system according to claim 10, wherein the pattern storage unit stores multiple types of graphic-object pattern images, and the second generating unit generates the interpolation image data of the portion of a graphic object corresponding to the drawing failure period using one pattern image of the pattern images, the one pattern image being similar to the image data of the graphic object generated by the first generating unit.

12. The projection apparatus according to claim 10, wherein the pattern storage unit stores multiple types of line pattern images, and the second generating unit generates the interpolation image data of the line corresponding to the drawing failure period using one pattern image of the pattern images, the one pattern image being similar in shape to the line drawn immediately before and after the drawing failure period.

13. The projection system according to claim 10, further comprising a selection accepting unit, wherein the projecting unit projects the multiple types of pattern images stored in the pattern storage unit, the selection accepting unit accepts selection of a pattern image from among the projected multiple types of pattern images from the drawing device, and the second generating unit generates the interpolation image data corresponding to the drawing failure period using the selected pattern image.

14. The projection system according to claim 10, wherein the pattern storage unit stores priorities of the pattern images on a pattern-image-by-pattern-image basis, and the second generating unit generates the interpolation image data corresponding to the drawing failure period using one pattern image of the pattern images, the one pattern image that is highest in priority.

15. The projection system according to claim 10, further comprising a history storage unit that stores history records about past uses of the pattern images by the second generating unit in generating the interpolation image data, wherein the second generating unit generates the interpolation image data corresponding to the drawing failure period using one pattern image of the pattern images, the one pattern image being largest in number of the history records.

16. The projection system according to claim 10, further comprising a deleting unit that, when instructed by the drawing device, deletes the interpolation image data projected by the projecting unit.

17. The projection apparatus according to claim 10, further comprising a deleting unit that deletes the image data generated by the first generating unit when the interpolation determining unit determines that generating the image data by interpolating the missing drawn portion corresponding to the drawing failure period is impracticable.

18. A projection apparatus that performs projection onto a projection surface, the projection apparatus comprising:

a receiving unit that receives drawing position information and drawing request information transmitted from a drawing device for projecting image data onto the projection surface, the drawing position information indicating a drawing designated position on the projection surface, the drawing request information requesting that drawing be performed;

a first generating unit that generates the image data to be projected onto the projection surface using the drawing position information that is received in a receiving period, over which the drawing request information is being received;

a judgement-value calculating unit that calculates a drawing failure period, over which the drawing position information is not received in the receiving period;

a pattern storage unit that stores multiple types of pattern images;

a second generating unit that generates interpolation image data of a portion corresponding to the drawing failure period using one pattern image of the pattern images, the one pattern image being similar to the image data generated by the first generating unit;

a projecting unit that projects the image data generated by the first generating unit interpolated with the interpolation image data generated by the second generating unit; and a selection accepting unit, wherein the projecting unit projects the multiple types of pattern images stored in the pattern storage unit, the selection accepting unit accepts selection of a pattern image from among the projected multiple types of pattern images from the drawing device, and the second generating unit generates the interpolation image data corresponding to the drawing failure period using the selected pattern image.

19. A projection apparatus that performs projection onto a projection surface, the projection apparatus comprising:

a receiving unit that receives drawing position information and drawing request information transmitted from a drawing device for projecting image data onto the projection surface, the drawing position information indicating a drawing designated position on the projection surface, the drawing request information requesting that drawing be performed;

a first generating unit that generates the image data to be projected onto the projection surface using the drawing position information that is received in a receiving period, over which the drawing request information is being received;

a judgement-value calculating unit that calculates a drawing failure period, over which the drawing position information is not received in the receiving period;

a pattern storage unit that stores multiple types of pattern images;

a second generating unit that generates interpolation image data of a portion corresponding to the drawing failure period using one pattern image of the pattern images, the one pattern image being similar to the image data generated by the first generating unit; and a projecting unit that projects the image data generated by the first generating unit interpolated with the interpolation image data generated by the second generating unit, wherein the pattern storage unit stores priorities of the pattern images on a pattern-image-by-pattern-image basis, and the second generating unit generates the interpolation image data corresponding to the drawing failure period using one pattern image of the pattern images, the one pattern image that is highest in priority.

20. A projection apparatus that performs projection onto a projection surface, the projection apparatus comprising:

a receiving unit that receives drawing position information and drawing request information transmitted from a drawing device for projecting image data onto the projection surface, the drawing position information indicating a drawing designated position on the projection surface, the drawing request information requesting that drawing be performed;

a first generating unit that generates the image data to be projected onto the projection surface using the drawing position information that is received in a receiving period, over which the drawing request information is being received;

a judgement-value calculating unit that calculates a drawing failure period, over which the drawing position information is not received in the receiving period;

a pattern storage unit that stores multiple types of pattern images;

a second generating unit that generates interpolation image data of a portion corresponding to the drawing failure period using one pattern image of the pattern images, the one pattern image being similar to the image data generated by the first generating unit;

a projecting unit that projects the image data generated by the first generating unit interpolated with the interpolation image data generated by the second generating unit; and a history storage unit that stores history records about past uses of the pattern images by the second generating unit in generating the interpolation image data, wherein the second generating unit generates the interpolation image data corresponding to the drawing failure period using one pattern image of the pattern images, the one pattern image being largest in number of the history records.

21. A projection system including a drawing device for projecting image data onto a projection surface and a projection apparatus that performs projection onto the projection surface, the projection system comprising:

a receiving unit that receives drawing position information and drawing request information transmitted from the drawing device, the drawing position information indicating a drawing designated position on the projection surface, the drawing request information requesting that drawing be performed;

a first generating unit that generates the image data to be projected onto the projection surface using the drawing position information that is received in a receiving period, over which the drawing request information is being received;

a judgement-value calculating unit that calculates a drawing failure period, over which the drawing position information is not received in the receiving period;

a pattern storage unit that stores multiple types of pattern images;

a second generating unit that generates interpolation image data of a portion corresponding to the drawing failure period using one pattern image of the pattern images, the one pattern image being similar to the image data generated by the first generating unit;

a projecting unit that projects the image data generated by the first generating unit interpolated with the interpolation image data generated by the second generating unit; and a selection accepting unit, wherein the projecting unit projects the multiple types of pattern images stored in the pattern storage unit, the selection accepting unit accepts selection of a pattern image from among the projected multiple types of pattern images from the drawing device, and the second generating unit generates the interpolation image data corresponding to the drawing failure period using the selected pattern image.

22. A projection system including a drawing device for projecting image data onto a projection surface and a projection apparatus that performs projection onto the projection surface, the projection system comprising:

a receiving unit that receives drawing position information and drawing request information transmitted from the drawing device, the drawing position information indicating a drawing designated position on the projection surface, the drawing request information requesting that drawing be performed;

a first generating unit that generates the image data to be projected onto the projection surface using the drawing position information that is received in a receiving period, over which the drawing request information is being received;

a judgement-value calculating unit that calculates a drawing failure period, over which the drawing position information is not received in the receiving period;

a pattern storage unit that stores multiple types of pattern images;

a second generating unit that generates interpolation image data of a portion corresponding to the drawing failure period using one pattern image of the pattern images, the one pattern image being similar to the image data generated by the first generating unit; and a projecting unit that projects the image data generated by the first generating unit interpolated with the interpolation image data generated by the second generating unit, wherein the pattern storage unit stores priorities of the pattern images on a pattern-image-by-pattern-image basis, and the second generating unit generates the interpolation image data corresponding to the drawing failure period using one pattern image of the pattern images, the one pattern image that is highest in priority.

23. A projection system including a drawing device for projecting image data onto a projection surface and a projection apparatus that performs projection onto the projection surface, the projection system comprising:

- a receiving unit that receives drawing position information and drawing request information transmitted from the drawing device, the drawing position information indicating a drawing designated position on the projection surface, the drawing request information requesting that drawing be performed;
- a first generating unit that generates the image data to be projected onto the projection surface using the drawing position information that is received in a receiving period, over which the drawing request information is being received;
- a judgement-value calculating unit that calculates a drawing failure period, over which the drawing position information is not received in the receiving period;
- a pattern storage unit that stores multiple types of pattern images;
- a second generating unit that generates interpolation image data of a portion corresponding to the drawing failure period using one pattern image of the pattern images, the one pattern image being similar to the image data generated by the first generating unit;
- a projecting unit that projects the image data generated by the first generating unit interpolated with the interpolation image data generated by the second generating unit; and
- a history storage unit that stores history records about past uses of the pattern images by the second generating unit in generating the interpolation image data, wherein the second generating unit generates the interpolation image data corresponding to the drawing failure period using one pattern image of the pattern images, the one pattern image being largest in number of the history records.

* * * * *